C. D. MOODY.
Car Starter and Brake.
No. 77,903. Patented May 12, 1868.
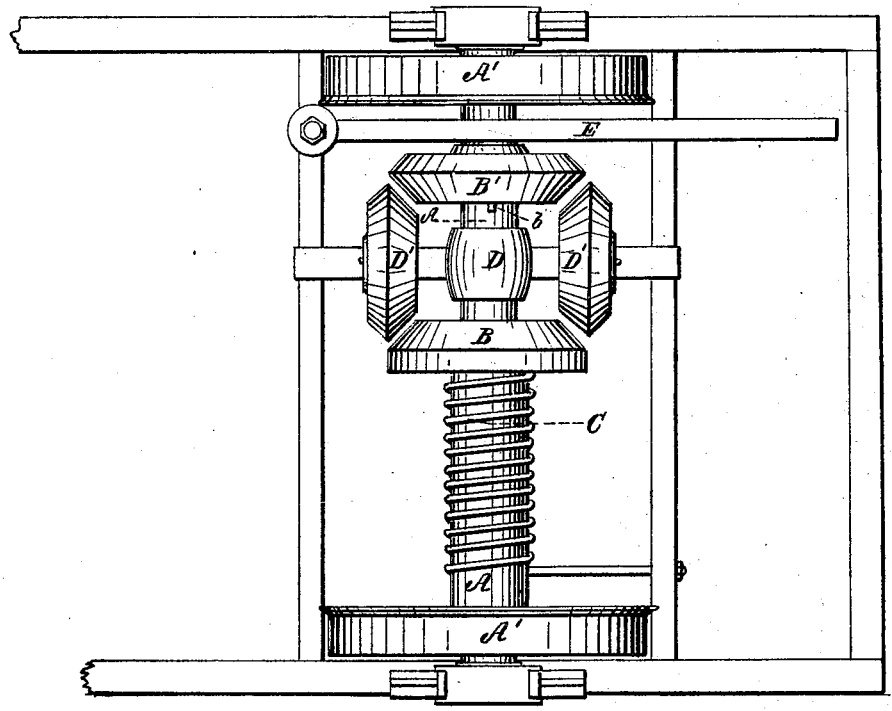
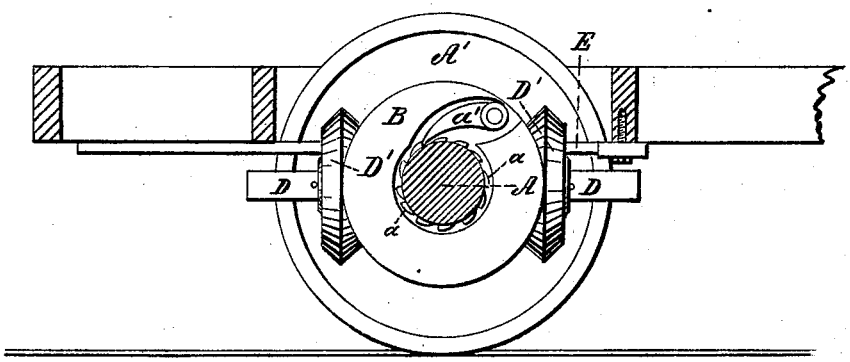

United States Patent Office.

C. D. MOODY, OF ST. LOUIS, MISSOURI, ASSIGNOR TO HIMSELF AND HORACE BILLINGS, OF BEARDSTOWN, ILLINOIS.

Letters Patent No. 77,903, dated May 12, 1868; antedated April 28, 1868.

CAR-BRAKE AND STARTER.

The Schedule referred to in these Letters Patent and making part of the same.

TO ALL WHOM IT MAY CONCERN:

Be it known that I, C. D. MOODY, of the city and county of St. Louis, and State of Missouri, have invented a new Device for Braking and Starting Cars; and I do hereby declare that the following is a full and clear description thereof, reference being had to the accompanying drawings, and to the letters of reference marked thereon.

This invention consists in the application to the axle of a car, of a spiral spring, coiled around the axle, and so operated as to be wound up by the application of the brake-rods and certain other mechanical arrangements, which will be hereinafter more fully described, and a portion of the power that will be exerted to stop the car will thus be stored up in the said spiral spring, and may be used to assist in starting the car again after the brake-rods shall have been released.

To enable those skilled in the art to make and use my improved apparatus, I will proceed to describe its construction and operation.

Figure 1 of the drawings is a plan of the said braking-device.

Figure 2 is a sectional elevation of it.

The axle A is to be firmly secured to the wheels A', as usual. There is a loose wheel, B, on the axle A, between the wheels A', and a spiral spring, C, coiled around the said axle, one end of the spring being fastened to the car-frame and the other end of it to the wheel B. There is also on the same axle another wheel, B', of the same size and form as the wheel B; both of these wheels being mitre-geared friction or corrugated wheels. The wheel B' is arranged loosely on the axle A, so it may receive a longitudinal sliding motion on the said axle; and, for the purpose of imparting to the wheel this sliding motion, it is provided with a lever, E, which lever is operated in the same manner as any common brake. Therefore the details of it are not shown. The wheel B' is turned with the axle A by means of a tongue, $b$, attached to the axle, and projecting into a suitable groove cut in the wheel to receive it. There is a short axle, D, placed across the axle A, between the wheels B and B', and it should be perforated so as to allow the axle A to pass through it. This short axle D will only have a sliding motion on the axle A, and it will have on each of its ends a small bevel-wheel, D'. When the lever E is thrown over, so as to slide the wheel B' up against the wheels D', the said wheel B', as it revolves with the axle A, will, through the medium of the wheels D', transmit a rotary motion to the wheel B in the opposite direction to the motion of the axle, and, as one end of the spring C is attached to this wheel, as has already been stated, the spring C will be wound up tightly around the axle A. The wheels D', like those marked B and B', may be simply friction-wheels, or they may be corrugated. There is a ratchet, $a$, on the axle A, into which the pawl $a'$, on the wheel B, takes hold, so as to take up the slack of the spring C, while it is being wound up around the axle, and this ratchet and pawl will enable the spring to act upon the axle, so as to turn it when the lever E releases the friction-wheels B' and D' from the wheel B, and so assist in starting the car. As soon as the force of the spring C is spent, a small spring (not shown) will throw the pawl out of its ratchet, so the car may be backed or run in the opposite direction. The pawl $a'$ will be thrown down into its ratchet by a spring, (not shown,) so as to act simultaneously with the action of the friction-wheels B, B', and D'. A similar device to the one already described will be placed on each end of the car, the only difference being the direction in which the teeth of the ratchets are set on the axle and the spring wound around it. The apparatus on one end of the car will be used while the car is going in one direction, and that on the other while it is going in the opposite direction.

Having described my invention, what I claim, is—

The combination and arrangement of the wheels B, B', and D, with the axle A, and the spring C, as described and set forth.

C. D. MOODY.

Witnesses:
M. RANDOLPH,
S. M. RANDOLPH.